United States Patent

[11] 3,598,197

[72] Inventor Roy M. Neece
     Forth Worth, Tex.
[21] Appl. No. 832,356
[22] Filed June 11, 1969
[45] Patented Aug. 10, 1971
[73] Assignee Dynaplastics, Inc.
     Fort Worth, Tex.

[54] ABSORBENT BEZEL FOR AIR CONDITIONER
     4 Claims, 5 Drawing Figs.
[52] U.S. Cl. ................................................ 180/90,
                                                        98/2 E
[51] Int. Cl. .................................................. B60r 21/04
[50] Field of Search............................................ 180/90;
     280/150 B; 98/265, 2 E; 62/244; 296/70

[56] References Cited
     UNITED STATES PATENTS
2,165,660  7/1939  Snyder et al. .................. 180/90

| | | | |
|---|---|---|---|
| 2,624,596 | 1/1953 | Clingman | 180/90 X |
| 2,818,933 | 1/1958 | Tell | 180/90 |
| 2,855,066 | 10/1958 | Nallinger | 180/90 |
| 3,138,085 | 6/1964 | Mitchell | 98/2 |
| 3,498,402 | 3/1970 | Barenyi | 180/90 |
| 3,509,697 | 5/1970 | Dewey et al | 62/262 |

Primary Examiner—Kenneth H. Betts
Attorney—Wofford and Felsman

ABSTRACT: A front panel assembly for automobile air conditioners and comprised of a generally rectangular open frame and a flexible open cover around the frame. In one form of the invention the rearwardly extending edges of the cover are secured to the frame by screws and in another form of the invention the cover is secured to the frame by bonding. In both forms the front of the cover is spaced from the frame to form a projecting sealed air pocket to provide a cushion for protecting passengers in the automobile.

PATENTED AUG 10 1971
3,598,197
SHEET 1 OF 2
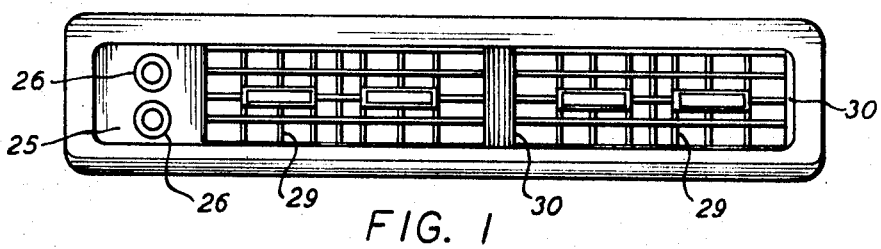
FIG. 1
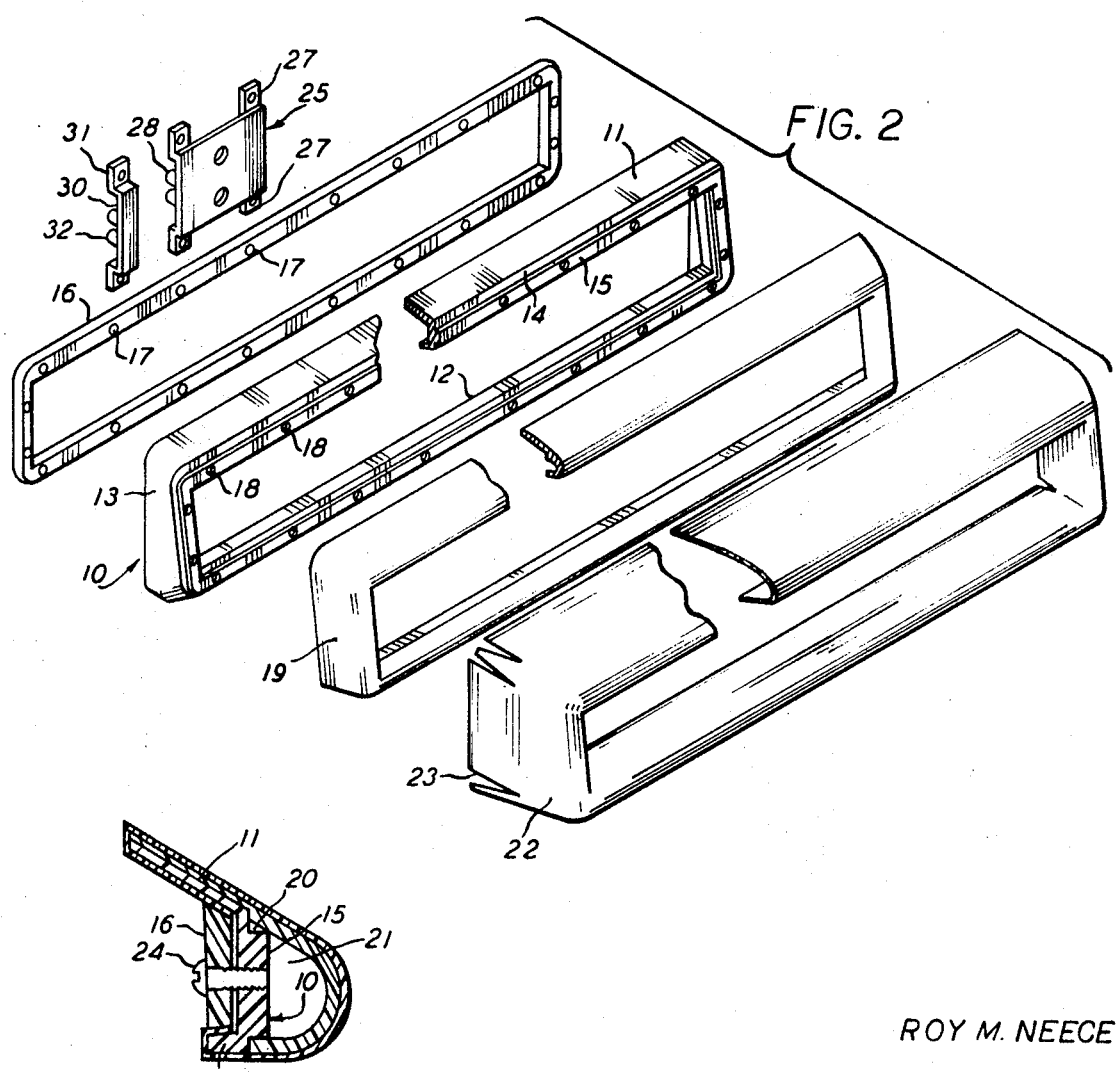
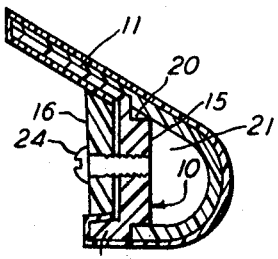
FIG. 3
ROY M. NEECE
INVENTOR
BY Herbert J. Brown
ATTORNEY

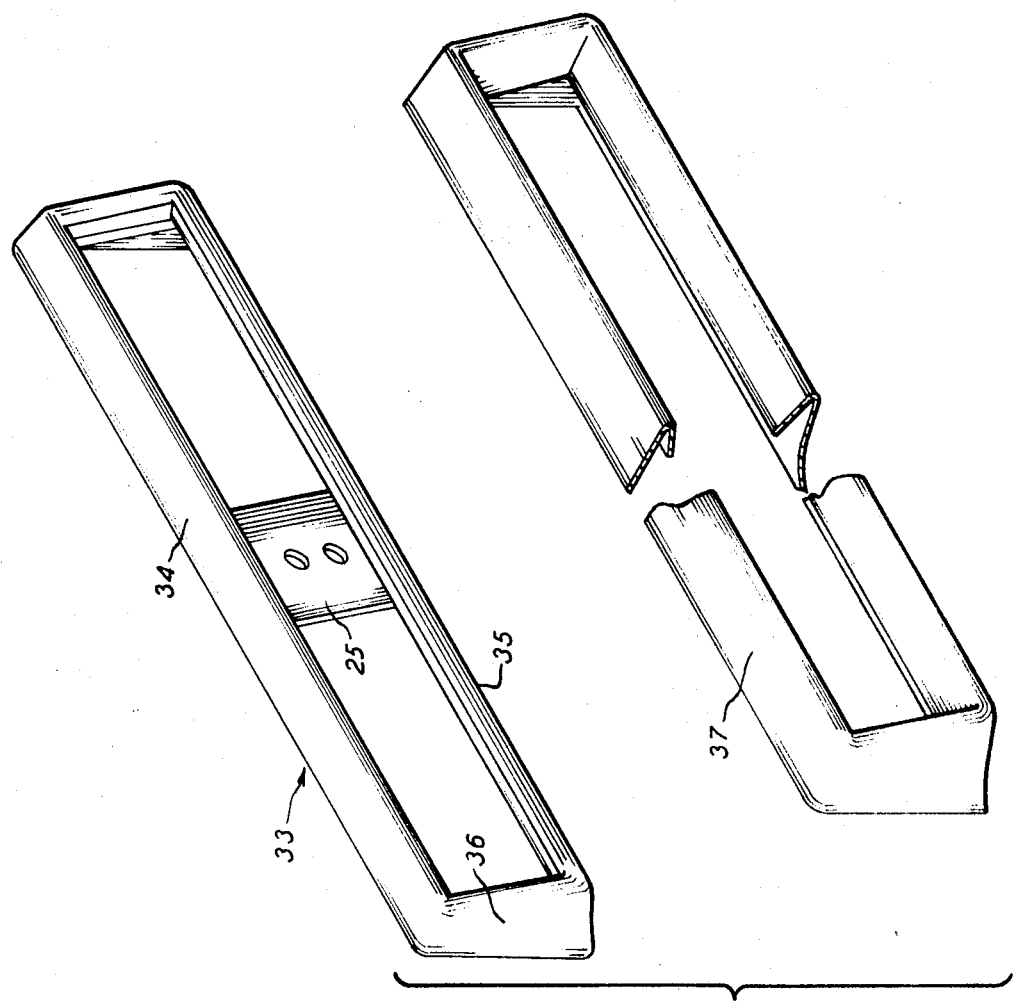
FIG. 4
FIG. 5
ROY M. NEECE
INVENTOR.
BY 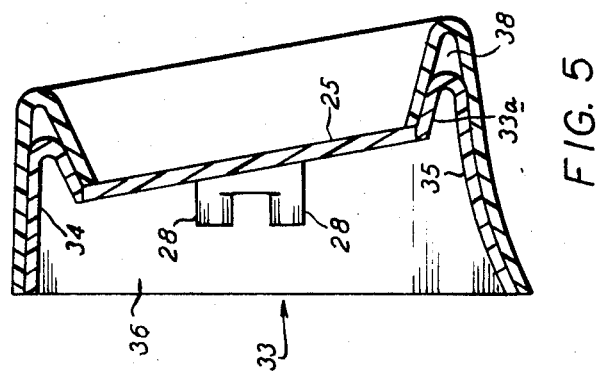
ATTORNEY

ABSORBENT BEZEL FOR AIR CONDITIONER

This invention relates to automobile air conditioners of the type mounted beneath automobile instrument panels and has reference to a panel assembly supporting directional louvers and a plate for mounting control knobs. By reason of its tapered wall a panel such as herein illustrated and described is often referred to as a bezel. It is to be understood that the present panel, which is open for supporting directional louvers, is mounted on the front of an air conditioner case.

An object of the invention is to provide an automobile air conditioner panel having an air cushion around its extending edge for preventing injuries or bruises in the event a passenger strikes his leg thereagainst.

Another object of the invention is to provide, in one form of the invention, a shock absorbing core around the frame for further reducing possible injury.

Another object of the invention is to provide, with possible exception of the louvers, an all plastic construction for economy of construction and simplicity of assembly.

A further object of the invention is to provide an open frame capable of supporting louver mounts and a control plate in any desired arrangement, that is, whereby the control plate may be mounted at either end of the frame and the louver mounts may be arranged according to the locations of the louvers.

These and other objects of the invention will become apparent from the following description and the accompanying drawings, in which:

FIG. 1 is a front elevational view of an automobile air conditioner panel according to the invention and showing an exemplary arrangement of a control plate and louvers.

FIG. 2 is an exploded view, shown partly in broken section, of a preferred form of the invention.

FIG. 3 is an enlarged transverse sectional view taken along the upper side of the assembly including coinciding matching holes in the frame and locking wedge.

FIG. 4 is an exploded perspective view, shown partly in broken section, of a modified form of the invention.

FIG. 5 is an enlarged transverse section of the form of the invention illustrated in FIG. 4.

Referring now to FIGS. 2 and 3, the panel shown includes a frame 10 having forwardly converging upper and lower walls 11 and 12 and vertical end walls 13. There is an open front wall 14 around the last referred to walls and there is a raised shoulder 15 around the periphery of the opening. A flange 10a projects inwardly, or rearwardly from the front around the opening of the front wall 14 and is spaced from the remaining walls 11, 12 and 13. Preferably, the frame 10 is molded of rigid plastic such as acrylonitrile butadiene styrene copolymer.

Also of rigid plastic, there is an open locking wedge 16 shaped to be received in the tapered upper and lower frame walls 11 and 12 and the vertical end walls 13. The wedge 16 has screw receiving holes 17 which match threaded holes 18 in the frame 10.

Around the frame 10 and covering the frame shoulder 15 there is a shock absorbing core 19 of molded resilient plastic having the characteristics of rubber. As shown in FIG. 3, the inner surface of the core 19 is shaped, at 20, to fit around the frame shoulder 15. As best shown in FIG. 3 the curved forward edge of the core 19 projects forwardly of and around the frame shoulder 15 to provide an air cushion 21.

The core 19 has a cover 22 of preformed thin flexible plastic and may be of a color to match the interior of the automobile in which the air conditioner is installed. The rear corners of the cover 22 are notched at 23 for convenience when folding the rear edge of the cover around the rear edges of the frame walls 11, 12 and 13. The cover 22 is secured in place by the locking wedge 16 and screws 24 received in the holes 17 in the locking wedge and the threaded holes 18 in the frame 10.

A control mounting plate 25 is illustrated in FIGS. 1 and 2 and includes openings for receiving knob controls 26 and has brackets 27 for attaching the plate to the locking wedge 16. The last referred to attachment may be made by means of screws, not shown, or by bonding. The rear surface of the control plate 25 has internally threaded projections 28 for mounting louvers 29 which may be conventional and are shown only in FIG. 1. Louver mounts 30 having brackets 31 and threaded projections 32 are applied in the same manner as the control plate 25 and additionally support the louvers 29.

The form of the invention shown in FIGS. 4 and 5 includes a molded frame 33 of ABS or other rigid material and like the first described frame, has a top wall 34, bottom wall 35, end walls 36 and an inwardly projecting spaced flange 33a therearound. As shown, the bottom wall 35 is concave in transverse section as a matter of ornamental design. Similar to the shock absorbing core 19, there is a molded cover 37 of rubberlike material over all outer surfaces of the frame 33 and the front portion of which is spaced from the front of the frame to provide an air cushion 38. A control plate 25 and louver mounts, as previously described, are bonded to the inner periphery of the frame 33, and the shock absorbing cover 37 is also bonded to the frame.

What I claim is:

1. A front panel for an automobile air conditioner comprising:
    a frame of rigid material having top, bottom and side walls, the front edges of said walls having rearwardly extending flanges to provide a louver receiving opening;
    a formed layer of resilient material secured around the outer surfaces of said frame walls and a portion of the surfaces of said flanges, said layer of resilient material having a portion that is spaced from the front edges of said frame to provide an air cushion therebetween; and
    a cover of flexible material extending over said resilient material and securing said resilient material in place, the edges of said cover extending around the rear edges of said frame and being secured intermediate said frame and a locking member; said locking member being secured to the back of said frame.

2. The front panel of claim 1 wherein said locking member is secured to the back of said frame by fastening means that also define a plurality of stations for positioning a control plate and a louver mount, and wherein said louver mount and said control plate are fastened at respective and preselected ones of said plurality of stations between the edges of said flanges.

3. A front panel for an automobile air conditioner comprising:
    a frame of rigid material having top, bottom and side walls, the front edges of said walls having rearwardly extending flanges to provide a louver receiving opening;
    a formed layer of resilient material secured around the outer surfaces of said frame walls and on a portion of the surfaces of said flanges, said layer of resilient material having a portion that is spaced from the front edges of said frame to provide an air cushion therebetween; and
    at least one louver mount and a control plate bonded between the edges of said flanges at selected positions relative to the sidewalls of said frame.

4. A front panel for an automobile air conditioner comprising:
    a molded rigid frame having top, bottom and side walls defining a louver receiving opening and having a predetermined outer contour that includes a front edge portion; and
    a premolded, resilient shock absorbing cover having a first portion of its interior surface that is premolded to conformingly fit said predetermined outer contour, and having a second portion of its interior surface that is premolded to protrude forwardly of said front edge portion; said premolded shock absorbing cover having its first portion bonded to substantially the entire said outer contour of said molded rigid frame except said front edge portion, and having its second portion protruding forwardly of said front edge portion to trap a volume of air and form a compressible air cushion forwardly of said front edge portion; said shock absorbing cover thereby forming a second external contour.